United States Patent
Wong

(10) Patent No.: US 12,007,880 B2
(45) Date of Patent: Jun. 11, 2024

(54) DYNAMIC TEST AUTOMATION PRIORITIZATION

(71) Applicant: SAP SE, Walldorf (DE)

(72) Inventor: Johnson Wong, Vancouver (CA)

(73) Assignee: SAP SE, Walldorf (DE)

( * ) Notice: Subject to any disclaimer, the term of this patent is extended or adjusted under 35 U.S.C. 154(b) by 113 days.

(21) Appl. No.: 17/551,019

(22) Filed: Dec. 14, 2021

(65) Prior Publication Data

US 2023/0185700 A1 Jun. 15, 2023

(51) Int. Cl.
*G06F 11/36* (2006.01)

(52) U.S. Cl.
CPC ...... *G06F 11/3688* (2013.01); *G06F 11/3692* (2013.01)

(58) Field of Classification Search
CPC ... G06F 11/36; G06F 11/3688; G06F 11/3692
See application file for complete search history.

(56) References Cited

U.S. PATENT DOCUMENTS

| | | | | |
|---|---|---|---|---|
| 6,950,771 B1* | 9/2005 | Fan | .......... | G11C 29/44 |
| | | | | 714/724 |
| 2012/0290879 A1* | 11/2012 | Shibuya | ........... | G05B 23/021 |
| | | | | 714/26 |
| 2015/0309906 A1* | 10/2015 | Salame | ............... | G06F 11/0709 |
| | | | | 714/33 |
| 2016/0162392 A1* | 6/2016 | Hu | .......... | G06F 11/3688 |
| | | | | 714/38.1 |
| 2016/0381121 A1* | 12/2016 | Costantino | ............ | G06F 16/245 |
| | | | | 709/219 |
| 2020/0319219 A1* | 10/2020 | Vansickler | ............. | G01N 35/04 |
| 2021/0157605 A1* | 5/2021 | Tremblay | .............. | G06F 9/46 |

* cited by examiner

*Primary Examiner* — Kamini B Patel
(74) *Attorney, Agent, or Firm* — Fountainhead Law Group P.C.

(57) ABSTRACT

Large and complex software projects may be distributed over multiple repositories and may use test automation of equivalent scale in continuous integration frameworks to maintain quality of the project. Such test automation often has significant hardware and time costs to run, which may mean that a failure of the software in the test automation takes longer to detect. Delay in fixing the software may increase the chance of more failures getting checked into the software repositories and perpetuating software failures. To address this issue, a ranking of historical test data is determined based on a number of failures for each test and a test configuration is determined based on the ranking such that tests that are ranked higher are performed before tests that are ranked lower. The test may be exited upon detection of failure instead of continuing.

20 Claims, 7 Drawing Sheets

DYNAMIC TEST AUTOMATION PRIORITIZATION

BACKGROUND

The present disclosure pertains to testing of computer software and in particular to software test automation.

Large and complex software projects may be distributed over multiple repositories and may use test automation of equivalent scale in continuous integration frameworks to maintain quality of the project. Such test automation often has significant hardware and time costs to run, which may mean that a failure of the software in the test automation takes longer to detect. Thereby delaying the analysis and fixing of the software, which may cascade into software builds staying broken longer, which may increase the chance of more failures getting checked into the software repositories and perpetuating the cycle of detecting, analyzing, and fixing software failures. This may also lead to lost productivity and extra stress for software developers working to meet deadlines when typically the frequency and importance of changes checked in to the repositories is increased.

The present disclosure addresses these issue and others, as further described below.

SUMMARY

One embodiment provides a computer system comprising one or more processors. The computer system further comprises one or more machine-readable medium coupled to the one or more processors and storing computer program code. The computer program code includes sets of instructions executable by the one or more processors to determine a ranking of a plurality of tests from historical test data for a software application. The historical test data includes identifiers of the plurality of tests and indications of failure corresponding to the plurality of tests. The historical test data indicates number of failures for each test of the plurality of tests previously encountered when testing the software application. The ranking of the plurality of tests is based on the number of failures for each test. The computer program code further includes sets of instructions executable by the one or more processors to determine a test configuration for testing the software application based on the ranking. The test configuration sets an order for performing the plurality of tests such that tests that are ranked higher are performed before tests that are ranked lower. The computer program code further includes sets of instructions executable by the one or more processors to perform a set of tests on the software application based on the test configuration. The performance of the set of tests on the software application includes performing the plurality of tests in the order set by the test configuration. The computer program code further includes sets of instructions executable by the one or more processors to update the historical test data based on the performance of the set of tests to obtain updated historical test data. The updated historical test data includes an identifier of any particular test that failed during the performance of the set of tests and a corresponding indication of failure.

Another embodiment provides one or more non-transitory computer-readable medium storing computer program code. The computer program code includes sets of instructions to determine a ranking of a plurality of tests from historical test data for a software application. The historical test data including identifiers of the plurality of tests and indications of failure corresponding to the plurality of tests. The historical test data indicating number of failures for each test of the plurality of tests previously encountered when testing the software application. The ranking of the plurality of tests based on the number of failures for each test. The computer program code further includes sets of instructions to determine a test configuration for testing the software application based on the ranking. The test configuration sets an order for performing the plurality of tests such that tests that are ranked higher are performed before tests that are ranked lower. The computer program code further includes sets of instructions to perform a set of tests on the software application based on the test configuration. The performance of the set of tests on the software application including performing the plurality of tests in the order set by the test configuration. The computer program code further includes sets of instructions to update the historical test data based on the performance of the set of tests to obtain updated historical test data. The updated historical test data includes an identifier of any particular test that failed during the performance of the set of tests and a corresponding indication of failure.

Another embodiment provides a computer-implemented method. The method includes determining a ranking of a plurality of tests from historical test data for a software application. The historical test data including identifiers of the plurality of tests and indications of failure corresponding to the plurality of tests. The historical test data indicating number of failures for each test of the plurality of tests previously encountered when testing the software application. The ranking of the plurality of tests based on the number of failures for each test. The method further includes determining a test configuration for testing the software application based on the ranking. The test configuration sets an order for performing the plurality of tests such that tests that are ranked higher are performed before tests that are ranked lower. The method further includes performing a set of tests on the software application based on the test configuration. The performance of the set of tests on the software application including performing the plurality of tests in the order set by the test configuration. The method further includes updating the historical test data based on the performance of the set of tests to obtain updated historical test data. The updated historical test data includes an identifier of any particular test that failed during the performance of the set of tests and a corresponding indication of failure.

The following detailed description and accompanying drawings provide a better understanding of the nature and advantages of the present disclosure.

DETAILED DESCRIPTION

Figure 1:
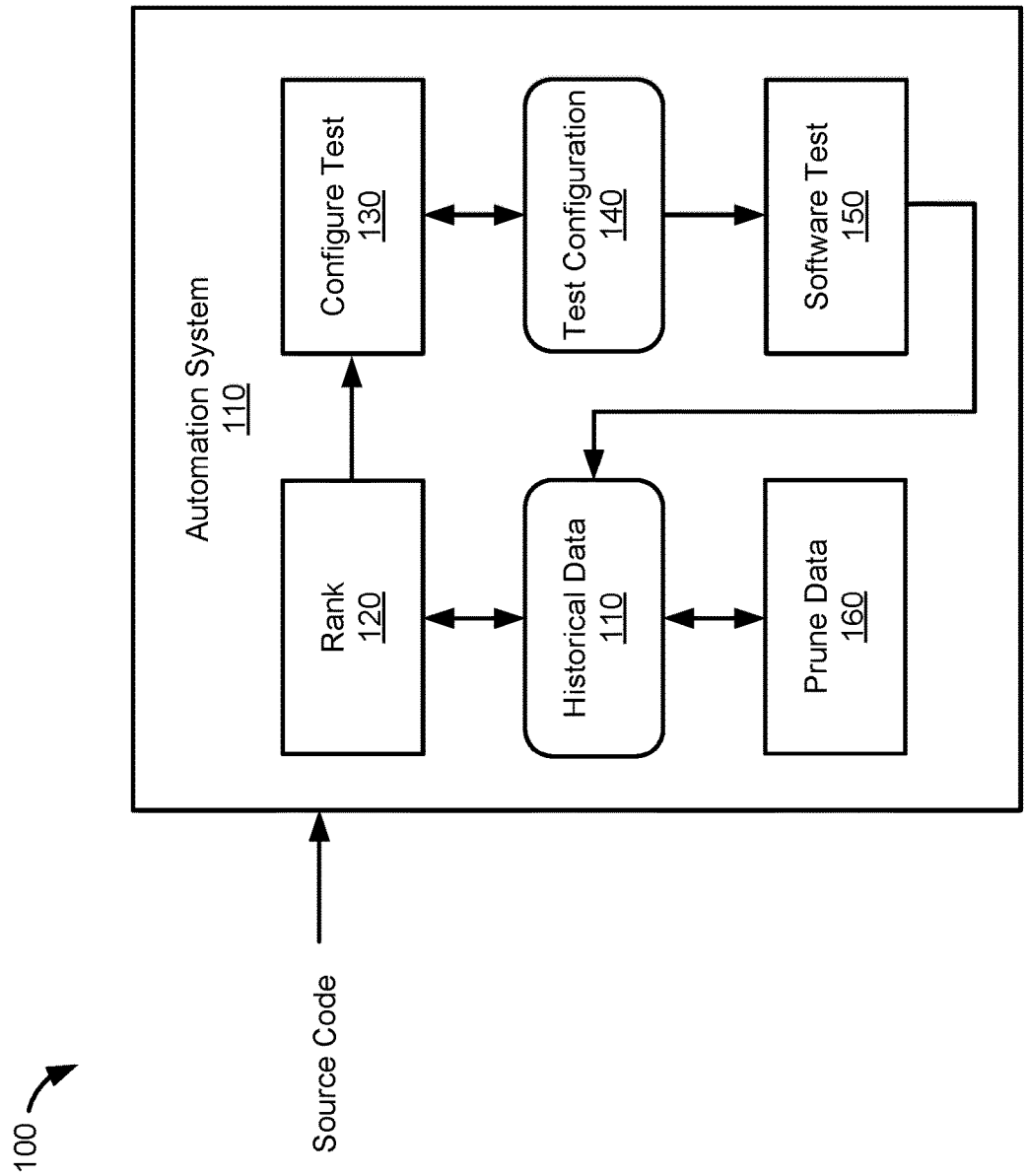
FIG. 1 shows a diagram of an automation system, according to an embodiment.

In the following description, for purposes of explanation, numerous examples and specific details are set forth in order to provide a thorough understanding of the present disclosure. Such examples and details are not to be construed as unduly limiting the elements of the claims or the claimed subject matter as a whole. It will be evident, based on the language of the different claims, that the claimed subject matter may include some or all of the features in these examples, alone or in combination, and may further include modifications and equivalents of the features and techniques described herein.

In the figures and their corresponding description, while certain elements may be depicted as separate components, in some instances one or more of the components may be combined into a single device or system. Likewise, although certain functionality may be described as being performed by a single element or component within the system, the functionality may in some instances be performed by multiple components or elements working together in a functionally coordinated manner. In addition, hardwired circuitry may be used independently or in combination with software instructions to implement the techniques described in this disclosure. The described functionality may be performed by custom hardware components containing hardwired logic for performing operations, or by any combination of computer hardware and programmed computer components. The embodiments described in this disclosure are not limited to any specific combination of hardware circuitry or software. The embodiments can also be practiced in distributed computing environments where operations are performed by remote data processing devices or systems that are linked through one or more wired or wireless networks. As used herein, the terms "first," "second," "third," "fourth," "fifth," "sixth," "seventh," "eighth," "ninth," "tenth," etc., do not necessarily indicate an ordering or sequence unless indicated. These terms, as used herein, may simply be used for differentiation between different objects or elements.

As mentioned above, large and complex software projects may be distributed over multiple repositories and may use test automation of equivalent scale in continuous integration frameworks to maintain quality of the project. Such test automation often has significant hardware and time costs to run, which may mean that a failure of the software in the test automation takes longer to detect. Thereby delaying the analysis and fixing of the software, which may cascade into software builds staying broken longer, which may increase the chance of more failures getting checked into the software repositories and perpetuating the cycle of detecting, analyzing, and fixing software failures. This may also lead to lost productivity and extra stress for software developers working to meet deadlines when typically the frequency and importance of changes checked in to the repositories is increased.

To remediate these issues and others, the present disclosure provides systems and methods for testing software that reduce the automation failure detection and analysis time using a test framework that dynamically adjusts how tests are run based on historical data, prioritizing automation that more frequently fails. Furthermore, the test framework may also exit early on failures.

FIG. 1 shows a diagram 100 of an automation system 110, according to an embodiment.

The automation system 110 may be part of the test framework that dynamically adjusts how tests are run based on historical data. The automation system 110 may be implemented by a computer system (e.g., a server computer) or a plurality of computer systems in communication with one another. The automation system 110 includes computer hardware (e.g., hardware as described below with respect to FIG. 7) such as one or more computer processors and memory (e.g., system memory and storage memory). The automation system 110 may execute various software modules to perform the functions described here. For example, the automation system 110 may include a Rank module 120, a Configure Test module 130, a Software Test module 150, and a Prune Data module 160. The memory of the automation system 110 may store Historical Data 110 and Test Configuration information 140 corresponding to tests for one or more software applications.

To test a software application, the automation system 110 first receives or obtains source code for the software application and Historical Data 110 for the software application. The autonomous system 110 may determine to test the software application in response to a new version of source code being checked into a code repository (not shown) or using a timer, for example.

The software application is tested based on the historical data 110, which may indicate which tests of a plurality of tests for testing the software application have failed. In some embodiments, the historical data 110 includes recent failures and older failures are removed from the historical data 110 by the Prune Data module 160. The Prune Data module 160 may remove entries in the historical data based on a predetermined threshold value (e.g., a certain number of days). In some embodiments, the Historical Data 110 may only include tests that failed. Other tests that have not failed (or not recently) may be part of the set of tests for testing the software application but may not be indicated in the Historical Data 110.

The Rank module 120 may rank the software tests according to the number of times that each test encountered a failure. This ranking may be provided to the Configure Test module 130 which may modify the Test Configuration 140 according to the ranking such that tests that have a higher number of failures are performed before tests having a lower number of failures, according to the Historical Data 110. In some embodiments, the ranking may not be based only on the Historical Data 110 but may also be based on importance information (used to weight the number of failures). In some embodiments the rankings may be based on computer resource usage information or network resource usage information. For example, tests that use fewer resources may be performed before tests using more resources when other factors are equal.

The Software Test module 150 may then test the software application using the plurality of tests in the order set by the Test Configuration 140. If one of the tests fails, the Software Test module 150 may update the Historical Data 110. In some embodiments, the Software Test 150 may track a number of tests that have encountered failure while testing the software application and it may exit the test earlier if a threshold number of tests fail such that some of the tests are not performed. As part of testing, the Automation System 110 may compile the code, at least to a certain degree, prior to running the tests depending on the format of the source code. Some source code may not be compiled. For example, JavaScript source code may be interpreted on-the-fly by a JS engine. The testing process may not generate a complete deployment package that involves compiling, obfuscating, and packaging of the code into production-ready binaries, for example, which are usually more CPU intensive and take more time.

The ranking, configuration, and testing process performed by the automation system 110 may be especially helpful for large and complex software project that include multiple software repository dependencies. One of the reasons is that large complex projects require significant test automation to maintain their quality, but more automation requires more resources and time to run. Such projects also tend to have code where developers working on it increasingly depend on automation to test whether their changes have broken something. As a result, developers push a lot of changes up to continuous integration systems to test their code prior to being allowed to check-in which puts even more strain on automation resources and the time it takes to run. What may further exacerbate these issues is the growing trend for such projects to be componentized and distributed over multiple repositories.

Figure 2:
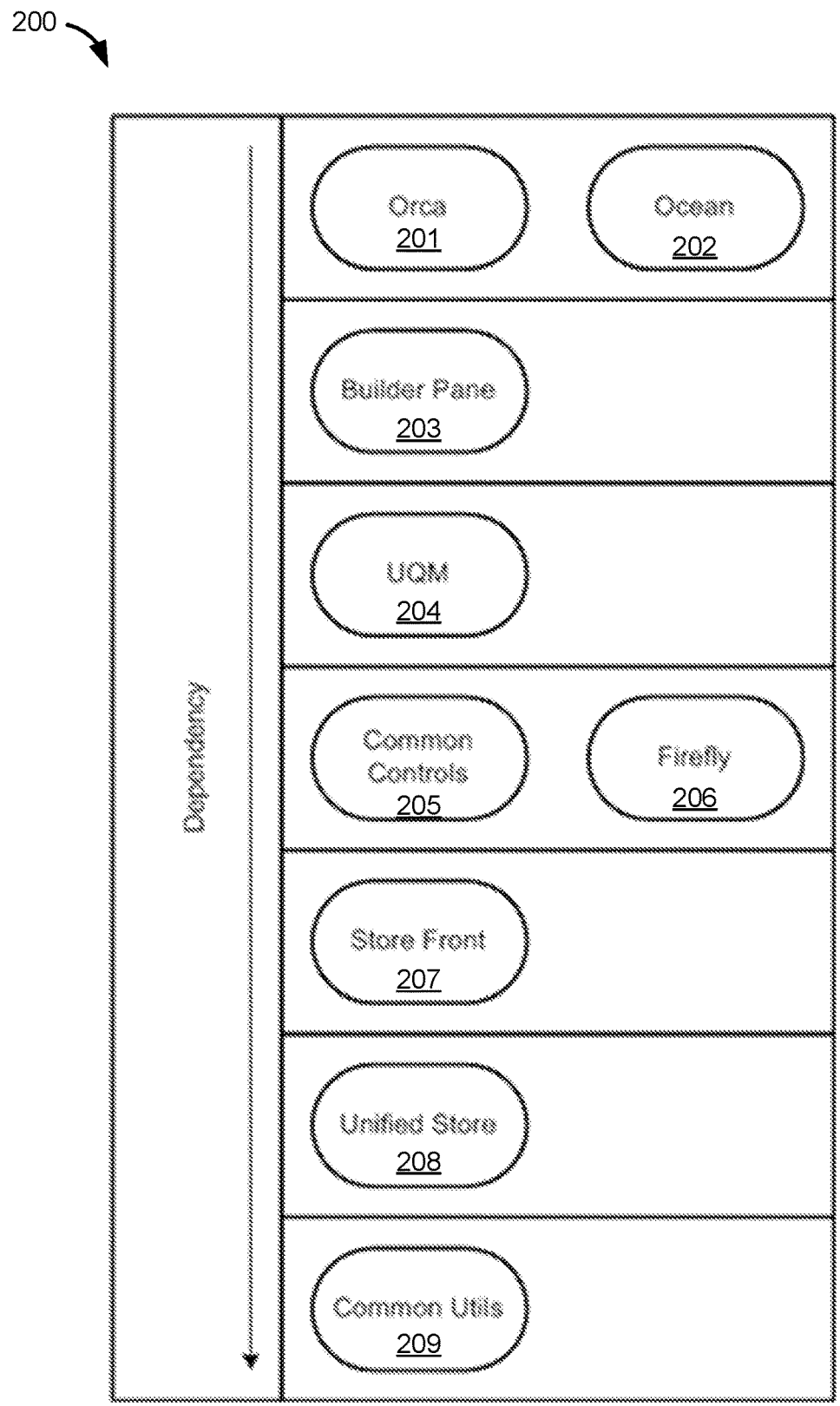
FIG. 2 shows an example diagram of software repository dependencies.

FIG. 2 shows an example diagram 200 of software repository dependencies. Diagram 200 shows multiple repositories 201-209 in an example software project. The repositories 201-209 are conceptually separated into levels to express dependencies, where all repositories in each level depend on all repositories in all lower levels. In this example, an "Orca" repository 201 and an "Ocean" repository 202 may depend on a "Builder Pane" repository 203, which may depend on a "UQM" repository 204, which may depend on a "Common Control" repository 205 and a "Firefly" repository 206, which may both depend on a "Store Front" repository 207, which may depend on a "Unified Store" repository 208, which may depend on a "Common Utils" repository 209, for example. Note that diagram 200 is just an example of repository dependencies. Different software projects would have different repository dependencies. Certain software projects may only use a single repository. The ranking and test configuration techniques described herein are advantageous for single repository software projects as well as multiple repository software projects.

The use of multiple repositories for a software project has various benefits. For example, multiple repositories may be used by different software development teams, contributing to their independence. In one example, the different repositories may correspond to different microservice components in a software project implemented with the microservices architecture. However, repository dependencies may become problematic when repositories depend on code in other repositories. This means that assessing the quality of a code check-in does not just depend on automation of the repository it belongs to, but also on other repositories that depend on it. This gets even more complex as the dependencies go through not just one, but multiple levels of repositories as shown in diagram 200. As one example of the problematic nature of multiple repository dependencies, a check-in of a new version of source code into the "Common Utils" repository 209 can potentially break a subset or even all dependent repositories above it. One main reason for the buildup of automation failures is the time to get feedback that something has gone wrong. For example, if downstream automation takes on average two hours to encounter and report a failure, this offers a two hour window in which developers in upstream repositories can check-in potentially more breaks which can build up.

Such problems may also impact productivity as well as morale of everyone involved and becomes very critical near deadlines where in some cases the frequency of check-ins increases, changes are more important to get in (e.g., to fix serious bugs), continuous integration hardware is under heavier load resulting in longer run times, and the chance for automation failures increase along with the time to detect, analyze, and fix them.

Accordingly, implementing the ranking and software testing techniques described herein is especially advantageous for software projects using multiple repositories with dependencies between them by improving detection and analysis of failures through providing quicker feedback while not compromising on test coverage needed for a change to be checked in. As further described herein, this is done by having the test framework track historical automation data in the form of a ranked listing of tests where more frequently failing tests are run first, and the test framework exits early when failures are encountered. That is, the test automation framework may use historical data to prioritize most frequently broken automation by building up a ranked list of automation sorted descending by frequency, running automation in the order of this list, and exiting early on failures.

This approach may yield a much faster turnaround time for automation runs which leads to quicker feedback on failures, less strain on hardware, and smaller windows of time for multiple failures to accumulate. This in turn leads to quicker detection, identification of the root cause, and a subsequent fix. This works especially well when the same failures occur very often, which may happen to be the case for certain software projects. Exiting early also allows the benefits to scale well even as the number of tests per run increases.

While this approach works well when dealing with a multi-repository project, it can also apply to single repository projects where there is less chance (but still possible) for failures to get checked in and accumulate. Note that faster turnaround time is not achieved by compromising on test coverage. For example, there exist approaches where only a subset of tests are chosen to run to reduce the automation time but this leads to gaps which can affect product quality. Instead, in the approach described herein, when there are no failures, all tests are still run (rather than a subset). Furthermore, the test automation system may ensure that there are no failures in order to successfully check-in source code to the repository. For instance, the source code checked-in may not be accessible until it tests successfully.

Figure 3:
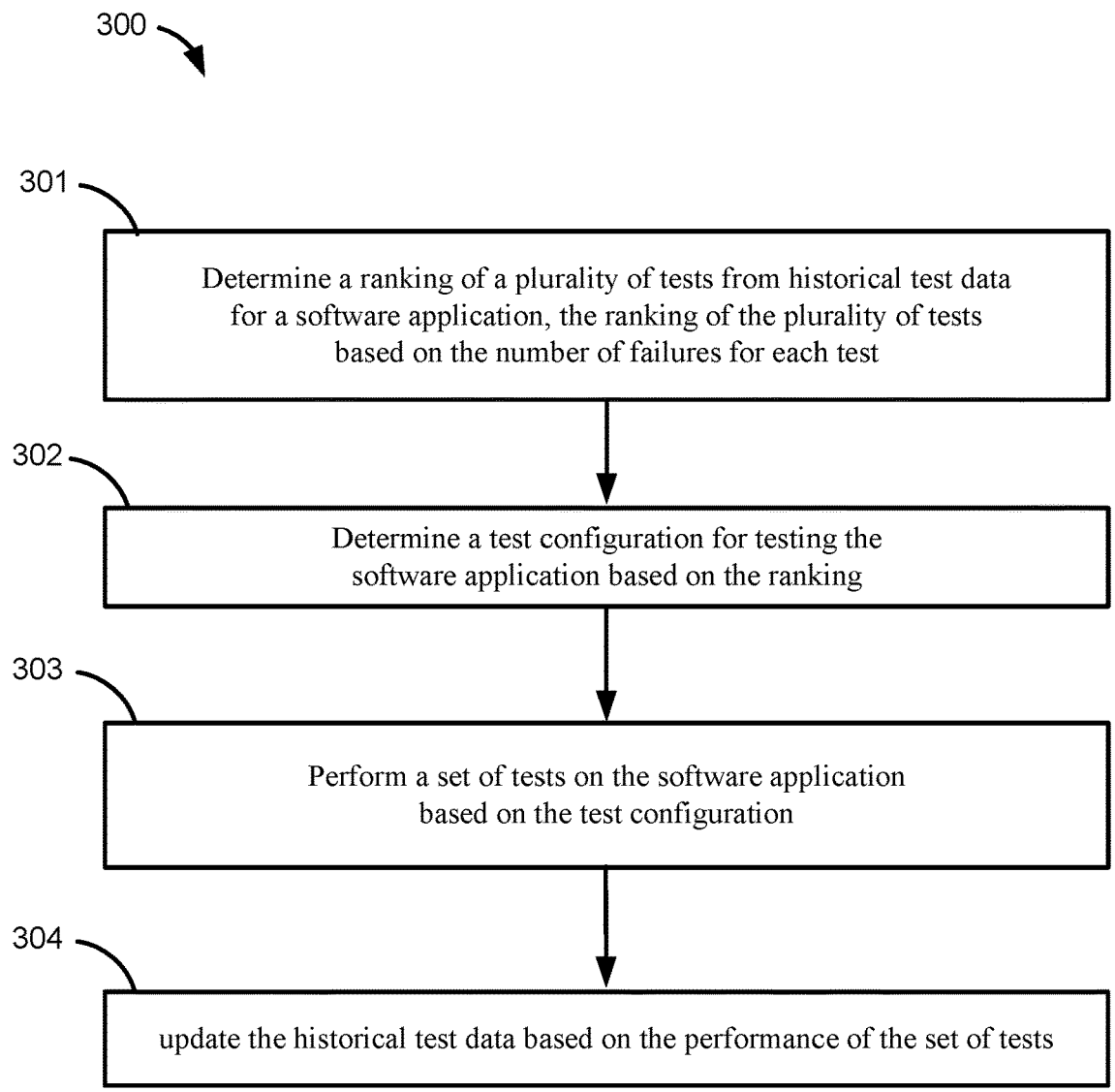
FIG. 3 shows a flow chart of a process for testing software, according to an embodiment.

FIG. 3 shows a flow chart 300 of a process for testing software, according to an embodiment. The process for testing software may be performed by the automation systems and test automation frameworks described here. The process may be used to perform the ranking, pruning, test configuration, and software application testing techniques and functions described above.

At 301, the process determines a ranking of a plurality of tests from historical test data for a software application. The historical test data includes identifiers of the plurality of tests and indications of failure corresponding to the plurality of tests. The historical test data indicates number of failures for each test of the plurality of tests previously encountered when testing the software application. The ranking of the plurality of tests is based on the number of failures for each test.

In some embodiments the process may also determine a weighted ranking of the plurality of tests based on the ranking of the plurality of tests and corresponding weight values for the plurality of tests. The weighted ranking for the plurality of tests may be further based on computer resource usage or network resource usage for the plurality of tests. The test configuration may then be based on the weighted ranking of the plurality of tests. Examples of the test configuration and further description of the ranking are provided below.

In some embodiments, the process may prune the historical test data prior to determining the ranking. In such embodiments, the process may remove one or more indications of failure from the historical test data to obtained pruned historical test data. The historical test data may include timestamps for each of the indications of failure, for example. That is, the indications of failure in the historical test data may be timestamps identifying when the corresponding test of the plurality of tests encountered a failure during testing of the application. The one or more indications of failure removed from the historical test data may have corresponding timestamps older than a particular threshold. The determination of the ranking may be based on the pruned historical test data.

In some embodiments, the identifier for a particular test of the plurality of tests may be based on one or more of a test file for the particular test, a test suite for the particular test, and a test name for the particular test. In some embodiments an indications of failure for the particular test is a timestamp when the particular test encountered a failure during testing of the application. Example formats and information that may be included in the historical data are provided below.

At 302, the process determines a test configuration for testing the software application based on the ranking. The test configuration sets an order for performing the plurality of tests such that tests that are ranked higher are performed before tests that are ranked lower.

At 303, performs a set of tests on the software application based on the test configuration. The performance of the set of tests on the software application includes performing the plurality of tests in the order set by the test configuration.

In some embodiments, the process may also detect that a failure is encountered in a particular test during the set of tests on the software application. In such embodiments, the process may cease the performance of the set of tests upon the detection of the failure such that tests in the set of tests that would be performed after the particular test, according to the order set by the test configuration, are not performed. In such embodiments the process may track a number of failures encountered during the set of tests of the software application. In such embodiments, the cessation of the performance of the set of sets may be further based on the number of failures being equal or greater than a predetermined value.

At 304, the process updates the historical test data based on the performance of the set of tests to obtain updated historical test data. The updated historical test data includes an identifier of any particular test that failed during the performance of the set of tests and a corresponding indication of failure.

The historical data, test configuration, ranking, pruning, test configuration, and software application testing techniques and functions of the automation system are further described below.

The test automation framework including an automation system, may be set up in different ways in different embodiments. Two different approaches for storing the historical data are described below with respect to FIG. 4 and FIG. 5.

Figure 4:
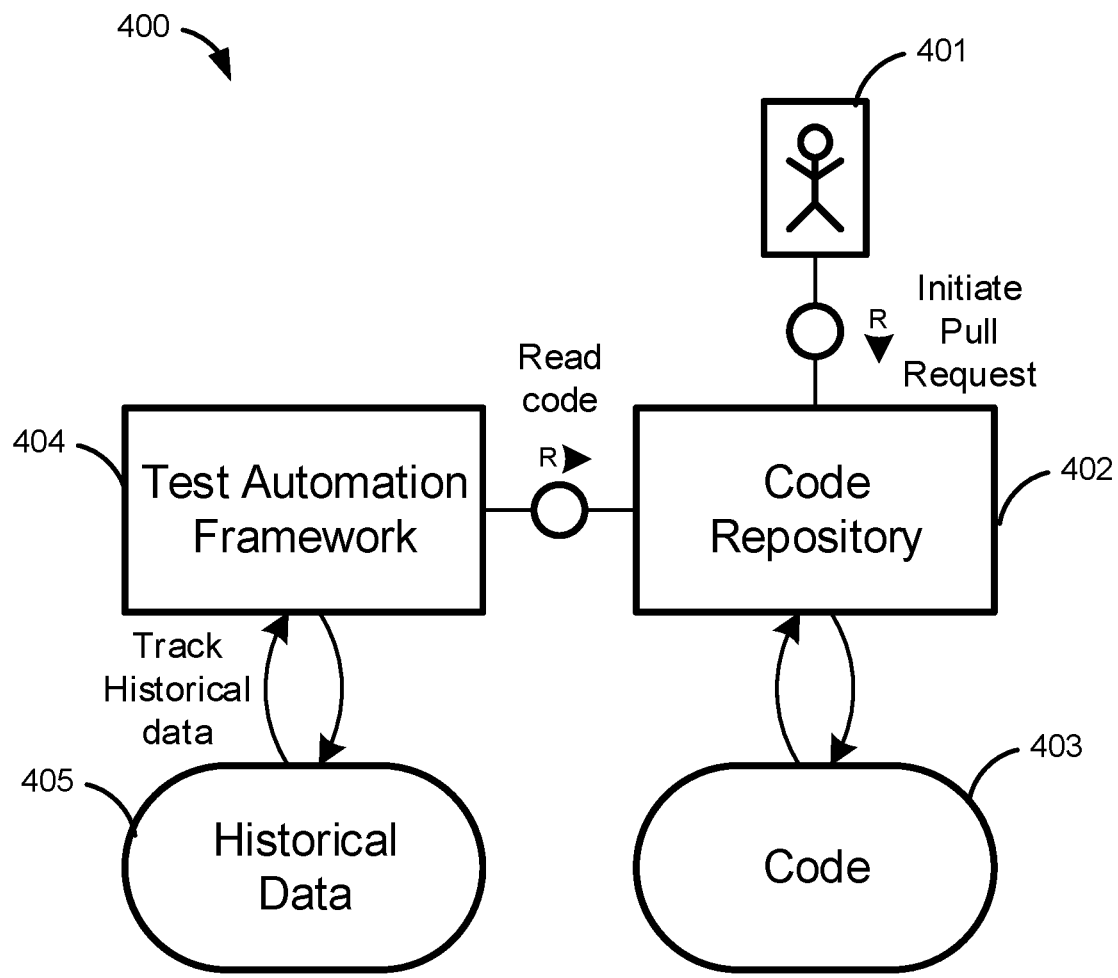
FIG. 4 shows a diagram of historical data stored within a test automation framework, according to an embodiment.

FIG. 4 shows a diagram 400 of historical data 405 stored within a test automation framework 404, according to an embodiment. In diagram 400, a user 401 (e.g., using a computer) may initiate a pull request to a code repository 402. The code repository 402 stores source code 403 for one or more software applications. The test automation framework may make a request to read the code from the code repository 402, which may provide certain stored code 403 as requested. The test automation framework 404 may store historical data 405 which is used to determine rankings for ordering a set of tests for testing the software application code as described herein. The test automation framework 404 may track the historical data when performing the software test.

Figure 5:
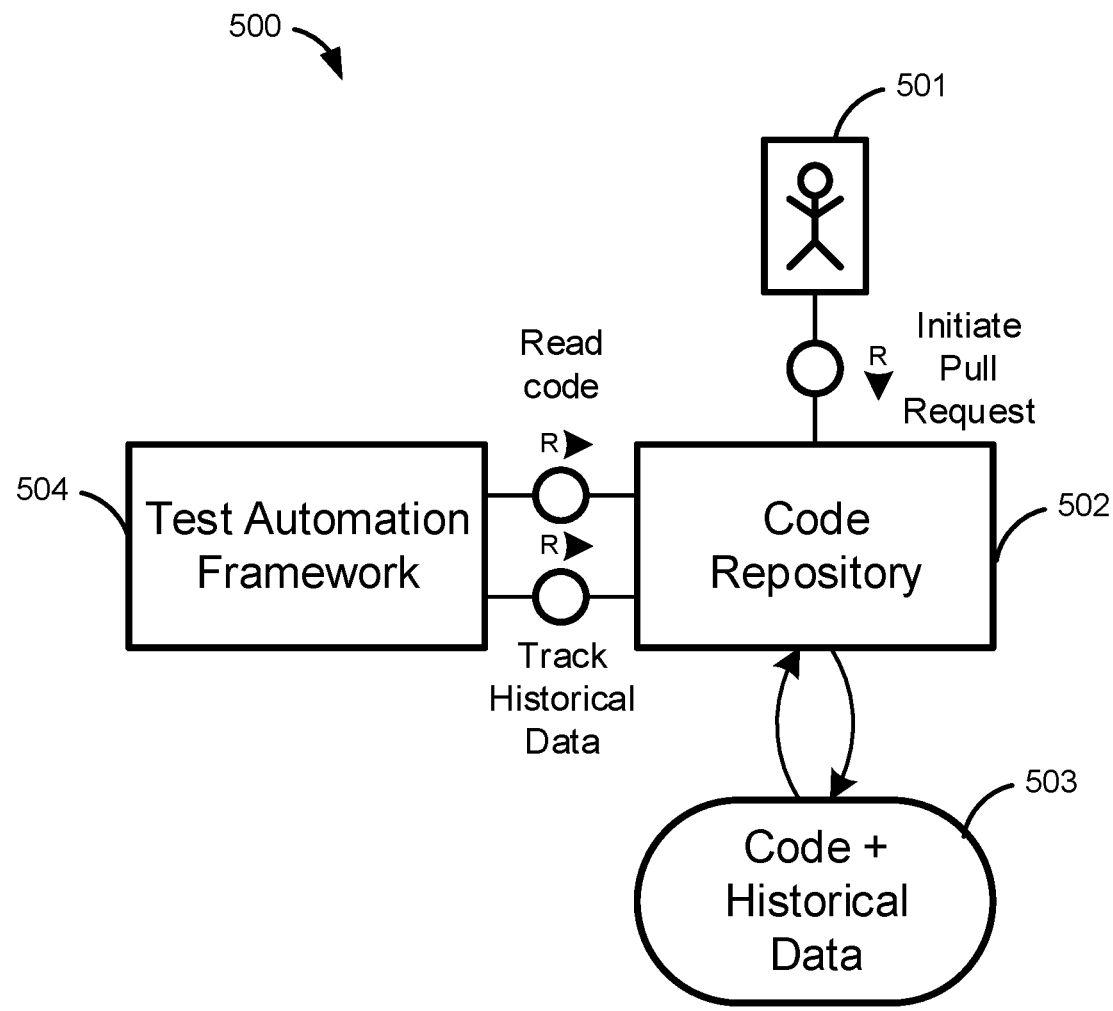
FIG. 5 shows a diagram of code and historical data stored within a code repository, according to an embodiment.

FIG. 5 shows a diagram 500 of code and historical data 503 stored within a code repository 502, according to an embodiment. In diagram 500, a user 501 (e.g., using a computer) may initiate a pull request to a code repository 502. The code repository 502 stores source code and historical data 503 for one or more software applications. The test automation framework 504 may make a request to read the code from the code repository 502, which may provide certain stored code 503 as requested. The test automation framework 405 may also make a request to track historical data to the code repository 502 to obtain the historical data to determine rankings for ordering a set of tests for testing the software application code as described herein. The test automation framework 504 may also send a request to update the historical data based on the results of performing the software test.

The historical data and test configuration are further described below.

The historical data may take many forms. One example involves storing a map of key-value pairs where the key is an identifier that uniquely identifies a test. For example, the identifier may be a combination of the test file name, suite name, and test name. This is depicted in the table below. Granularity can be adjusted as desired, for example only going down to the suite or file name.

| Test file | Test suite | Test name |
|---|---|---|
| test/unit/String.test.ts | String Tests | Modify String |
| test/unit/String.test.ts | String Tests | Concatenate Two Strings |
| test/integration/StringIntegration.test.ts | String Integration Tests | Send String |

The value in the map may then be the score used to rank entries in the map. In some embodiments it may be a list of timestamps of failures encountered in the past N days where N can be adjusted as desired. The number of failures (in this case timestamps) will be used for ranking the tests and ordering the tests. Entries with no failures in the past N days can simply be omitted from the map, reducing space usage and maintenance. Below is an example where the first test failed five times in the last N days, second test two times and third test one time.

| Key | Value |
|---|---|
| test/integration/StringIntegration.test.ts\|String Integration Tests\|Send String | 1630297230671<br>1630296857438<br>1630295573847<br>1630294869375<br>1630293683756 |
| test/unit/String.test.ts\| String Tests\|Modify String | 1630297768495<br>1630297362536 |

| Key | Value |
|---|---|
| test/unit/String.test.ts\| String Tests\|Concatenate Two Strings | 1630297377483 |

The map may also be maintained over time as tests are modified, added, and removed. This may be done after each test run where the test automation will reconcile its results against the historical data from where it is stored, then update the data. For example, entries older than the predefined time window may be pruned. This may be a reason for storing a list of timestamps. If all timestamps corresponding to an entry are removed, the entry itself can be removed.

Then, assuming only entries with one or more timestamps are stored, if a test is added, an entry will be added to the map only when it starts failing; if a test is removed, if it has a corresponding entry, that entry will stay in the map until it is pruned (in this case the test framework can ignore such entries when running tests); and if a test is modified such that its corresponding key in the map changes, that will be treated like a removal and addition of a test.

The test framework's consumption of the automation data can be implemented different ways depending on the type of tests involved. For example, the test framework may use a means to order test execution based on the historical data ranking. It may also exit early when encountering failures, for example.

Depending on the underlying test infrastructure, the ability to specify test order and exit early may already be supported. If not, it may be implemented with a higher-level script (ex. a nodeJS script if running in a node module or software registry environment) that does multiple runs analogous to running all tests together with a default order, but with different sets of tests where the sets are ordered. The number of failures needed prior to exiting can also be configured as desired to strike a balance between getting more feedback (e.g., if there are more downstream failures) while still offering gains to overall resource usage.

An example listing of a configuration file specifying the test execution order which would be generated by the test framework as described herein. The test framework may read a priority map, for example, read all files matching a certain file name pattern (e.g., "*.test.ts") in the project, and determine the test files to execute and the order the execute them. This configuration file is an example and test configurations may be formatted differently and include different information in other embodiments.

```
describe ('All tests', ( ) => {
  StringUtilityTests.CONVERT_TO_LOWER_CASE( );
  NumberUtilityTests.ADD_NUMBERS( );
  StringUtilityTests.CONVERT_TO_UPPER_CASE( );
  NumberUtilityTests.MULTIPLY_NUMBERS( );
  StringUtilityTests.CONCATENATE( );
});
```

An example of a test report generated by running tests is provided below. This report describes the test cases and which passed or failed. An "id" attribute has a key that may be used in the priority mapping. This test report is an example and test reports be formatted differently and include different information in other embodiments.

```
<?xml version="1.0" encoding="UTF-8"?>
<testsuites name="jest tests" tests="5" failures="0" errors="0" time="2.575">
  <testsuite name="All tests" errors="0" failures="0" skipped="0" timestamp="2021-11-08T01:46:59" time="2.261" tests="5">
    <testcase id="./unit/StringUtility.test|CONVERT_TO_LOWER_CASE" classname="All tests Convert to lower case" name="All tests Convert to lower case" time="0.005">
    </testcase>
    <testcase id="./unit/NumberUtility.test|ADD_NUMBERS" classname="All tests Add numbers" name="All tests Add numbers" time="0">
    </testcase>
    <testcase id="./unit/StringUtility.test|CONVERT_TO_UPPER_CASE" classname="All tests Convert to upper case" name="All tests Convert to upper case" time="0.001">
    </testcase>
    <testcase id="./unit/NumberUtility.test|MULTIPLY_NUMBERS" classname="All tests Convert to lower case" name="All tests Convert to lower case" time="0.001">
    </testcase>
    <testcase id="./unit/StringUtility.test|CONCATENATE" classname="All tests Concatenate" name="All tests Concatenate" time="0.001">
    </testcase>
  </testsuite>
</testsuites>
```

An example of a priority map in JSON format is provided below. This priority map is an example and priority maps may be formatted differently and include different information in other embodiments.

```
{
"./unit/StringUtility.test|CONVERT_TO_LOWER_CASE": [
1630297230671,
1630296857438,
1630295573847,
1630294869375,
1630293683756
],
"./unit/NumberUtility.test|ADD_NUMBERS": [
1630297230671,
1630296857438,
1630295573847
],
"./unit/StringUtility.test|CONVERT_TO_UPPER_CASE": [
1630297768495,
1630297362536
],
"./unit/NumberUtility.test|MULTIPLY_NUMBERS": [
1630297377483
]
}
```

An example configuration file for the automation framework is provided below. In this example, the configuration includes the "bail" option which indicates when to exit early (e.g., after N failures). This configuration file is an example and configuration files may be formatted differently and include different information in other embodiments.

```
export default {
  // Stop running tests after 'n' failures
  bail: 2,
  // Indicates which provider should be used to instrument code for coverage
  coverageProvider: "v8",
  // Use this configuration option to add custom reporters to Jest
  reporters: ["default", "jest-junit"],
```

-continued

```
// The regexp pattern or array of patterns that Jest uses
to detect test files
testRegex: "/test/AllTestsPrioritizedConfig.test.ts$",
// A map from regular expressions to paths to
transformers
transform: {
"^.+\\.tsx?$": "ts-jest"
},
};
```

The implementation can also keep the score as the number of failures, but group tests based on importance and resource usage, and apply the score within groups. Customization by other attributes can be statically managed or, like with the number of failures in the past N days, dynamically adjusted based on historical automation data leveraging the same framework and/or design.

An example of a test report including a failing test is provided below. In this example, the "CONVERT_TO_LOWER_CASE" code incorrectly converts to upper case instead of lower case.

```
<?xml version="1.0" encoding="UTF-8"?>
<testsuites name="jest tests" tests="5" failures="1" errors="0" time="3.298">
  <testsuite name="All tests" errors="0" failures="1" skipped="0" timestamp="2021-11-16T05:19:46" time="2.802" tests="5">
    <testcase id="./unit/StringUtility.test|CONVERT_TO_LOWER_CASE" classname="All tests Convert to lower case" name="All tests Convert to lower case" time="0.005">
      <failure>Error: expect(received).toBe(expected) // Object.is equality
Expected: "this is a test"
Received: "THIS IS A TEST"
    at Object.<anonymous> (C:\dynamic-test-prioritization\test\unit\StringUtility.test.ts:12:68)
    at Promise.then.completed (C:\dynamic-test-prioritization\node_modules\jest-circus\build\utils.js:390:28)
    at new Promise (<anonymous>)
    at callAsyncCircusFn (C:\dynamic-test-prioritization\node_modules\jest-circus\build\utils.js:315:10)
    at _callCircusTest (C:\dynamic-test-prioritization\node_modules\jest-circus\build\run.js:218:40)
    at processTicksAndRejections (internal/process/task_queues.js:95:5)
    at _runTest (C:\dynamic-test-prioritization\node_modules\jest-circus\build\run.js:155:3)
    at _runTestsForDescribeBlock (C:\dynamic-test-prioritization\node_modules\jest-circus\build\run.js:66:9)
    at _runTestsForDescribeBlock (C:\dynamic-test-prioritization\node_modules\jest-circus\build\run.js:60:9)
    at run (C:\dynamic-test-prioritization\node_modules\jest-circus\build\run.js:25:3)</failure>
    </testcase>
    <testcase id="./unit/NumberUtility.test|ADD_NUMBERS" classname="All tests Add numbers" name="All tests Add numbers" time="0">
    </testcase>
    <testcase id="./unit/StringUtility.test|CONVERT_TO_UPPER_CASE" classname="All tests Convert to upper case" name="All tests Convert to upper case" time="0.001">
    </testcase>
    <testcase id="./unit/NumberUtility.test|MULTIPLY_NUMBERS" classname="All tests Convert to lower case" name="All tests Convert to lower case" time="0.001">
    </testcase>
    <testcase id="./unit/StringUtility.test|CONCATENATE" classname="All tests Concatenate" name="All tests Concatenate" time="0.001">
    </testcase>
  </testsuite>
</testsuites>
```

The customization of the test configuration has been described above, including customizing the behavior of the test framework based on attributes such as Granularity of test prioritization, Number of failures in last N days, and Rules for pruning (ex. beyond last N days). The specific implementation can be further customized to suit different needs. For example, the scoring used for ranking may not be only based on the number of failures but also a number that accounts for multiple factors such as importance (e.g., if it tests a critical workflow) and CPU/memory/network usage (e.g., a heavy integration test that has high usage and takes a long time to run). The score for the ranking and ordering of tests may be an equation that includes these factors (in some quantified form) and can be modified as needed. For example:

score=[number of failures]*[importance]−[resource usage].

Figure 6:
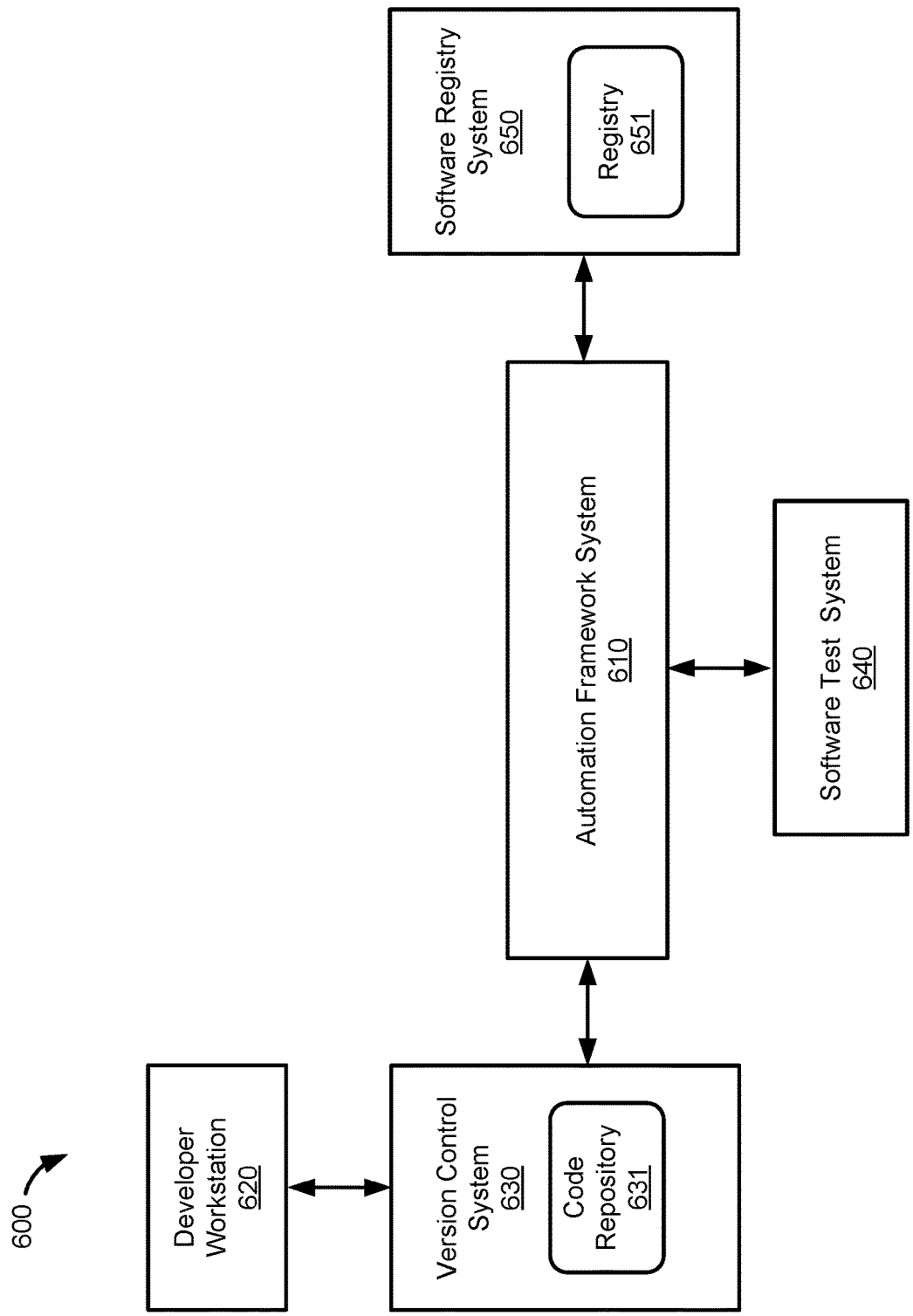
FIG. 6 shows a diagram of an automatic system, version control system, developer workstation, a software test system, and software registry system, according to an embodiment.

As discussed above, the automation framework and automation system may interact with a repository. It may also interact with a software registry system. FIG. 6 shows a diagram 600 of an automation framework system 610, version control system 630, developer workstation 620, a software test system 640, and a software registry system 650, according to an embodiment.

An example process using these systems is described below. A software developer using the developer workstation 620 may initiate a pull request with the version control system 630 to check-in code. The version control system 630 may include a code repository similar to the code repositories discussed above. The "pull request" may be a request to store (check-in) a new version of code in the code repository 631.

The automation framework system 610 may detect a new pull request and initiate a test of the code using the software test system 640. In some embodiments the software test system 640 may be part of the automation framework system 610. The software test system 640 may test the code to validate the changes to the code. As part of this test it may pull dependent components from the software registry system 650 which includes a registry 651 storing software artifacts needed for the automation to run. If all tests pass, the automation framework system 610 may allow the code to be checked in to the code repository 631 of the version control system 630. The automation framework system 610 may then build a deployment package for the software application using the checked-in source code component and upload it to the software registry system 650 to be stored in the registry 651 where it can be consumed by other packages.

Figure 7:
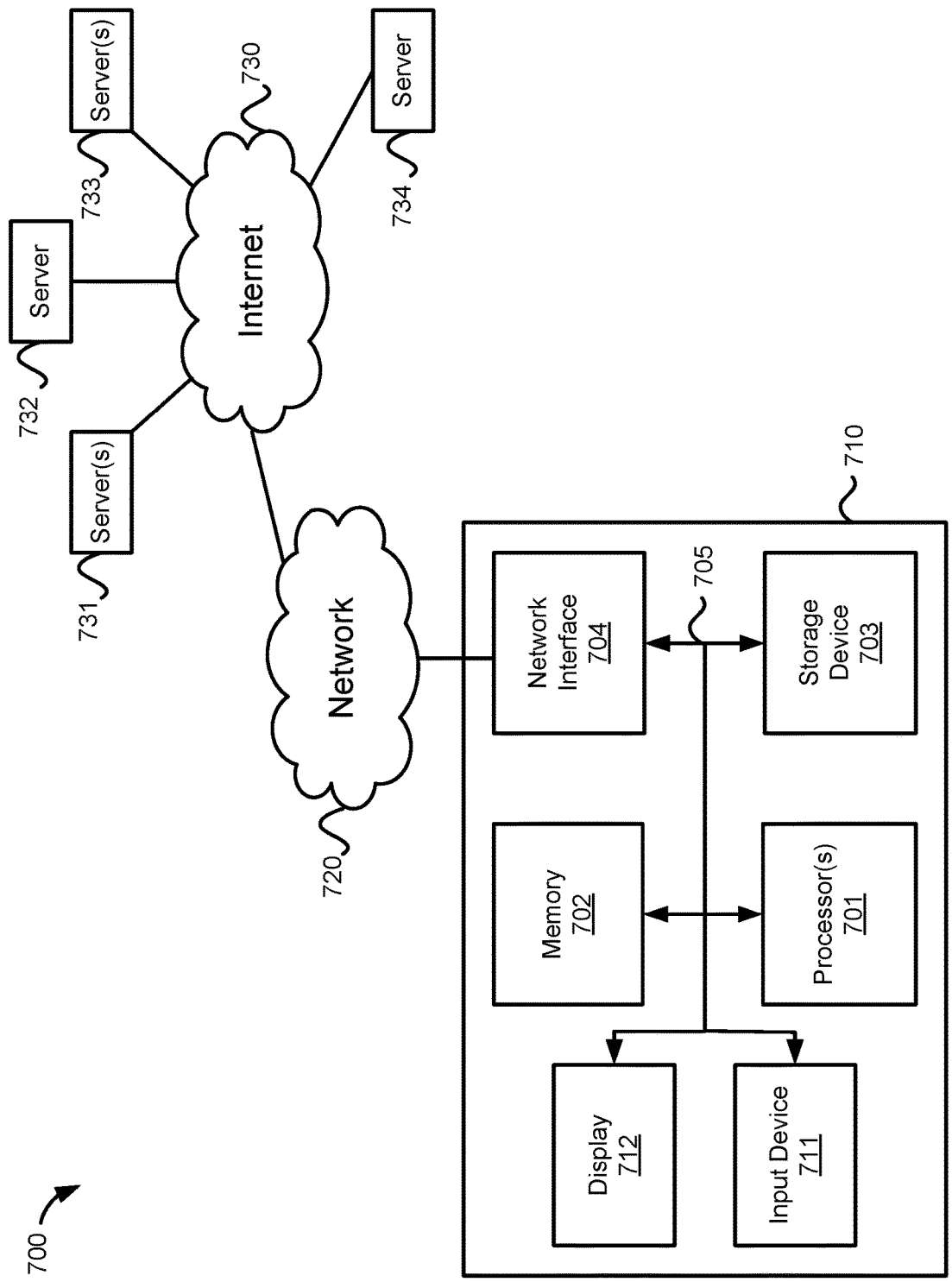
FIG. 7 shows a diagram of hardware of a special purpose computing machine for implementing systems and methods described herein.

FIG. 7 shows a diagram 700 of hardware of a special purpose computing machine for implementing systems and methods described herein. The following hardware description is merely one example. It is to be understood that a variety of computers topologies may be used to implement the above described techniques. The hardware shown in FIG. 7 may be used to implement the computer systems described herein. For example, the automation system described above may be implemented using hardware of the computer system 710 and the repository system and registry systems may be implemented using one or more of the servers 731-734. In some embodiments, the servers 731-734 may be implemented using hardware configured similar to the computer system 710.

The computer system 710 includes a bus 705 or other communication mechanism for communicating information, and one or more processor(s) 701 coupled with bus 705 for processing information. The computer system 710 also includes a memory 702 coupled to bus 705 for storing information and instructions to be executed by processor 701, including information and instructions for performing some of the techniques described above, for example. This memory may also be used for storing programs executed by processor(s) 701. Possible implementations of this memory may be, but are not limited to, random access memory (RAM), read only memory (ROM), or both. A storage device 703 is also provided for storing information and instructions. Common forms of storage devices include, for example, a hard drive, a magnetic disk, an optical disk, a CD-ROM, a DVD, a flash or other non-volatile memory, a USB memory card, or any other medium from which a computer can read. Storage device 703 may include source code, binary code, or software files for performing the techniques above, for example. Storage device and memory are both examples of non-transitory computer readable storage mediums.

The computer system 710 may be coupled via bus 705 to a display 712 for displaying information to a computer user. An input device 711 such as a keyboard, touchscreen, and/or mouse is coupled to bus 705 for communicating information and command selections from the user to processor 701. The combination of these components allows the user to communicate with the system. In some systems, bus 705 represents multiple specialized buses, for example.

The computer system also includes a network interface 704 coupled with bus 705. The network interface 704 may provide two-way data communication between computer system 710 and a network 720. The network interface 804 may be a wireless or wired connection, for example. The network 720 may be a local area network or an intranet, for example. The computer system 710 can send and receive information through the network interface 704, across the network 720, to computer systems connected to the Internet 730. Using the Internet 730 the computer system 710 may access data and features that reside on multiple different hardware servers 831-834. The servers 831-834 may be part of a cloud computing environment in some embodiments.

ADDITIONAL EMBODIMENTS

One embodiment provides a computer system comprising one or more processors. The computer system further comprises one or more machine-readable medium coupled to the one or more processors and storing computer program code. The computer program code includes sets of instructions executable by the one or more processors to determine a ranking of a plurality of tests from historical test data for a software application. The historical test data includes identifiers of the plurality of tests and indications of failure corresponding to the plurality of tests. The historical test data indicates number of failures for each test of the plurality of tests previously encountered when testing the software application. The ranking of the plurality of tests based on the number of failures for each test. The computer program code further includes sets of instructions executable by the one or more processors to determine a test configuration for testing the software application based on the ranking. The test configuration sets an order for performing the plurality of tests such that tests that are ranked higher are performed before tests that are ranked lower. The computer program code further includes sets of instructions executable by the one or more processors to perform a set of tests on the software application based on the test configuration. The performance of the set of tests on the software application includes performing the plurality of tests in the order set by the test configuration. The computer program code further includes sets of instructions executable by the one or more processors to update the historical test data based on the performance of the set of tests to obtain updated historical test data. The updated historical test data includes an identifier of any particular test that failed during the performance of the set of tests and a corresponding indication of failure.

In some embodiments of the computer system, the computer program code further comprises sets of instructions executable by the one or more processors to detect that a failure is encountered in a particular test during the set of tests on the software application and cease the performance of the set of tests upon the detection of the failure such that tests in the set of tests that would be performed after the particular test, according to the order set by the test configuration, are not performed.

In some embodiments of the computer system, the computer program code further comprises sets of instructions executable by the one or more processors to track a number of failures encountered during the set of tests of the software application, wherein the cessation of the performance of the set of sets is further based on the number of failures being equal or greater than a predetermined value.

In some embodiments of the computer system, the computer program code further comprises sets of instructions executable by the one or more processors to remove one or more indications of failure from the historical test data to obtained pruned historical test data, the historical test data including timestamps for each of the indications of failure, the one or more indications of failure removed from the historical test data having corresponding timestamps older than a particular threshold, wherein the determination of the ranking is based on the pruned historical test data.

In some embodiments of the computer system, the identifier for a particular test of the plurality of tests based on one or more of a test file for the particular test, a test suite for the particular test, and a test name for the particular test, wherein an indications of failure for the particular test is a timestamp when the particular test encountered a failure during testing of the application.

In some embodiments of the computer system, the indications of failure in the historical test data are timestamps identifying when the corresponding test of the plurality of tests encountered a failure during testing of the application.

In some embodiments of the computer system, the computer program code further comprises sets of instructions executable by the one or more processors to determine a weighted ranking of the plurality of tests based on the ranking of the plurality of tests and corresponding weight values for the plurality of tests, wherein the test configuration is based on the weighted ranking of the plurality of tests.

In some embodiments of the computer system, the weighted ranking for the plurality of tests is further based on computer resource usage or network resource usage for the plurality of tests.

Another embodiment provides one or more non-transitory computer-readable medium storing computer program code. The computer program code includes sets of instructions to determine a ranking of a plurality of tests from historical test data for a software application. The historical test data including identifiers of the plurality of tests and indications of failure corresponding to the plurality of tests. The historical test data indicating number of failures for each test of the plurality of tests previously encountered when testing the software application. The ranking of the plurality of tests based on the number of failures for each test. The computer program code further includes sets of instructions to determine a test configuration for testing the software application based on the ranking. The test configuration sets an order for performing the plurality of tests such that tests that are ranked higher are performed before tests that are ranked lower. The computer program code further includes sets of instructions to perform a set of tests on the software application based on the test configuration. The performance of the set of tests on the software application including performing the plurality of tests in the order set by the test configuration. The computer program code further includes sets of instructions to update the historical test data based on the performance of the set of tests to obtain updated historical test data. The updated historical test data includes an identifier of any particular test that failed during the performance of the set of tests and a corresponding indication of failure.

In some embodiments of the non-transitory computer-readable medium, the computer program code further comprises sets of instructions to detect that a failure is encountered in a particular test during the set of tests on the software application and cease the performance of the set of tests upon the detection of the failure such that tests in the set of tests that would be performed after the particular test, according to the order set by the test configuration, are not performed.

In some embodiments of the non-transitory computer-readable medium, wherein the computer program code further comprises sets of instructions to track a number of failures encountered during the set of tests of the software application, wherein the cessation of the performance of the set of sets is further based on the number of failures being equal to or greater than a predetermined value.

In some embodiments of the non-transitory computer-readable medium, the computer program code further comprises sets of instructions to remove one or more indications of failure from the historical test data to obtained pruned historical test data, the historical test data including timestamps for each of the indications of failure, the one or more indications of failure removed from the historical test data having corresponding timestamps older than a particular threshold, wherein the determination of the ranking is based on the pruned historical test data.

In some embodiments of the non-transitory computer-readable medium, the identifier for a particular test of the plurality of tests based on one or more of a test file for the particular test, a test suite for the particular test, and a test name for the particular test, wherein an indications of failure for the particular test is a timestamp when the particular test encountered a failure during testing of the application, and wherein the indications of failure in the historical test data are timestamps identifying when the corresponding test of the plurality of tests encountered a failure during testing of the application.

In some embodiments of the non-transitory computer-readable medium, the computer program code further comprises sets of instructions to determine a weighted ranking of the plurality of tests based on the ranking of the plurality of tests and corresponding weight values for the plurality of tests, wherein the test configuration is based on the weighted ranking of the plurality of tests, wherein the weighted ranking for the plurality of tests is further based on computer resource usage or network resource usage for the plurality of tests.

Another embodiment provides a computer-implemented method. The method includes determining a ranking of a plurality of tests from historical test data for a software application. The historical test data including identifiers of the plurality of tests and indications of failure corresponding to the plurality of tests. The historical test data indicating number of failures for each test of the plurality of tests previously encountered when testing the software application. The ranking of the plurality of tests based on the number of failures for each test. The method further includes determining a test configuration for testing the software application based on the ranking. The test configuration sets an order for performing the plurality of tests such that tests that are ranked higher are performed before tests that are ranked lower. The method further includes performing a set of tests on the software application based on the test configuration. The performance of the set of tests on the software application including performing the plurality of tests in the order set by the test configuration. The method further includes updating the historical test data based on the performance of the set of tests to obtain updated historical test data. The updated historical test data includes an identifier of any particular test that failed during the performance of the set of tests and a corresponding indication of failure.

In some embodiments of the computer-implemented method, the method further comprises detecting that a failure is encountered in a particular test during the set of tests on the software application and ceasing the performance of the set of tests upon the detection of the failure such that tests in the set of tests that would be performed after the particular test, according to the order set by the test configuration, are not performed.

In some embodiments of the computer-implemented method, the method further comprises tracking a number of failures encountered during the set of tests of the software application, wherein the cessation of the performance of the set of sets is further based on the number of failures being equal to a predetermination value.

In some embodiments of the computer-implemented method, the method further comprises removing one or more indications of failure from the historical test data to obtained pruned historical test data, the historical test data including timestamps for each of the indications of failure, the one or more indications of failure removed from the historical test data having corresponding timestamps older than a particular threshold, wherein the determination of the ranking is based on the pruned historical test data.

In some embodiments of the computer-implemented method, the identifier for a particular test of the plurality of tests based on one or more of a test file for the particular test, a test suite for the particular test, and a test name for the particular test, wherein an indications of failure for the particular test is a timestamp when the particular test encountered a failure during testing of the application, and wherein the indications of failure in the historical test data are timestamps identifying when the corresponding test of the plurality of tests encountered a failure during testing of the application.

In some embodiments of the computer-implemented method, the method further comprises determining a weighted ranking of the plurality of tests based on the ranking of the plurality of tests and corresponding weight values for the plurality of tests, wherein the test configuration is based on the weighted ranking of the plurality of tests, wherein the weighted ranking for the plurality of tests is further based on computer resource usage or network resource usage for the plurality of tests.

The above description illustrates various embodiments of the present disclosure along with examples of how aspects of the particular embodiments may be implemented. The above examples should not be deemed to be the only embodiments, and are presented to illustrate the flexibility and advantages of the particular embodiments as defined by the following claims. Based on the above disclosure and the following claims, other arrangements, embodiments, implementations, and equivalents may be employed without departing from the scope of the present disclosure as defined by the claims.

What is claimed is:

1. A computer system, comprising:
   one or more processors;
   one or more machine-readable medium coupled to the one or more processors and storing computer program code comprising sets of instructions executable by the one or more processors to:
   determine a ranking of a plurality of tests from historical test data for a software application, the historical test data including identifiers of the plurality of tests and indications of failure corresponding to the plurality of tests, the historical test data indicating a number of failures for each test of the plurality of tests previously encountered when testing the software application, the ranking of the plurality of tests based on the number of failures for each test;
   determine a test configuration for testing the software application based on the ranking, the test configuration setting an order for performing the plurality of tests such that tests that are ranked higher are performed before tests that are ranked lower;
   perform a set of tests on the software application based on the test configuration, the performance of the set of tests on the software application including performing the plurality of tests in the order set by the test configuration;
   update the historical test data based on the performance of the set of tests to obtain updated historical test data, the updated historical test data including an identifier of any particular test that failed during the performance of the set of tests and a corresponding indication of failure;
   detect that a failure is encountered in a particular test during the set of tests on the software application; and
   cease the performance of the set of tests upon the detection of the failure such that tests in the set of tests that would be performed after the particular test, according to the order set by the test configuration, are not performed.

2. The computer system of claim 1, wherein the computer program code further comprises sets of instructions executable by the one or more processors to: track the number of failures encountered during the set of tests of the software application, wherein the cessation of the performance of the set of tests is further based on the number of failures being equal to a predetermination value.

3. The computer system of claim 1, wherein the computer program code further comprises sets of instructions executable by the one or more processors to: remove one or more indications of failure from the historical test data to obtain pruned historical test data, the historical test data including timestamps for each of the indications of failure, the one or more indications of failure removed from the historical test data having corresponding timestamps older than a particular threshold, wherein the determination of the ranking is based on the pruned historical test data.

4. The computer system of claim 1, wherein the identifier for a particular test of the plurality of tests is based on one or more of a test file for the particular test, a test suite for the particular test, and a test name for the particular test, wherein an indication of failure for the particular test is a timestamp of when the particular test encountered a failure during testing of the application.

5. The computer system of claim 1, wherein the indications of failure in the historical test data are timestamps identifying when the corresponding test of the plurality of tests encountered a failure during testing of the application.

6. The computer system of claim 1, wherein the computer program code further comprises sets of instructions executable by the one or more processors to: determine a weighted ranking of the plurality of tests based on the ranking of the plurality of tests and corresponding weight values for the plurality of tests, wherein the test configuration is based on the weighted ranking of the plurality of tests.

7. The computer system of claim 6, wherein the weighted ranking for the plurality of tests is further based on computer resource usage or network resource usage for the plurality of tests.

8. The computer system of claim 1, wherein the computer program code further comprises sets of instructions executable by the one or more processors to: receive a request to test changes in source code corresponding to the software application; initiate one or more tests of the source code to validate changes in the source code, wherein the one or more tests of the source code correspond to tests of the test configuration for testing the software application; and in response to passing the one or more tests of the source code, build a deployment package for the software application using the source code.

9. One or more non-transitory computer-readable medium storing computer program code comprising sets of instructions to:
   determine a ranking of a plurality of tests from historical test data for a software application, the historical test data including identifiers of the plurality of tests and indications of failure corresponding to the plurality of tests, the historical test data indicating a number of failures for each test of the plurality of tests previously encountered when testing the software application, the ranking of the plurality of tests based on the number of failures for each test;

determine a test configuration for testing the software application based on the ranking, the test configuration setting an order for performing the plurality of tests such that tests that are ranked higher are performed before tests that are ranked lower;

perform a set of tests on the software application based on the test configuration, the performance of the set of tests on the software application including performing the plurality of tests in the order set by the test configuration;

update the historical test data based on the performance of the set of tests to obtain updated historical test data, the updated historical test data including an identifier of any particular test that failed during the performance of the set of tests and a corresponding indication of failure;

detect that a failure is encountered in a particular test during the set of tests on the software application; and cease the performance of the set of tests upon the detection of the failure such that tests in the set of tests that would be performed after the particular test, according to the order set by the test configuration, are not performed.

10. The non-transitory computer-readable medium of claim 9, wherein the computer program code further comprises sets of instructions to:

track the number of failures encountered during the set of tests of the software application, wherein the cessation of the performance of the set of tests is further based on the number of failures being equal to a predetermination value.

11. The non-transitory computer-readable medium of claim 9, wherein the computer program code further comprises sets of instructions to:

remove one or more indications of failure from the historical test data to obtain pruned historical test data, the historical test data including timestamps for each of the indications of failure, the one or more indications of failure removed from the historical test data having corresponding timestamps older than a particular threshold, wherein the determination of the ranking is based on the pruned historical test data.

12. The non-transitory computer-readable medium of claim 9, wherein the identifier for a particular test of the plurality of tests is based on one or more of a test file for the particular test, a test suite for the particular test, and a test name for the particular test, wherein an indication of failure for the particular test is a timestamp of when the particular test encountered a failure during testing of the application, and wherein the indications of failure in the historical test data are timestamps identifying when the corresponding test of the plurality of tests encountered a failure during testing of the application.

13. The non-transitory computer-readable medium of claim 9, wherein the computer program code further comprises sets of instructions to:

determine a weighted ranking of the plurality of tests based on the ranking of the plurality of tests and corresponding weight values for the plurality of tests, wherein the test configuration is based on the weighted ranking of the plurality of tests, wherein the weighted ranking for the plurality of tests is further based on computer resource usage or network resource usage for the plurality of tests.

14. The non-transitory computer-readable medium of claim 9, wherein the computer program code further comprises sets of instructions to:

receive a request to test changes in source code corresponding to the software application;

initiate one or more tests of the source code to validate changes in the source code, wherein the one or more tests of the source code correspond to tests of the test configuration for testing the software application; and in response to passing the one or more tests of the source code, build a deployment package for the software application using the source code.

15. A computer-implemented method, comprising:

determining a ranking of a plurality of tests from historical test data for a software application, the historical test data including identifiers of the plurality of tests and indications of failure corresponding to the plurality of tests, the historical test data indicating number of failures for each test of the plurality of tests previously encountered when testing the software application, the ranking of the plurality of tests based on the number of failures for each test;

determining a test configuration for testing the software application based on the ranking, the test configuration setting an order for performing the plurality of tests such that tests that are ranked higher are performed before tests that are ranked lower;

performing a set of tests on the software application based on the test configuration, the performance of the set of tests on the software application including performing the plurality of tests in the order set by the test configuration;

updating the historical test data based on the performance of the set of tests to obtain updated historical test data, the updated historical test data including an identifier of any particular test that failed during the performance of the set of tests and a corresponding indication of failure;

detecting that a failure is encountered in a particular test during the set of tests on the software application; and ceasing the performance of the set of tests upon the detection of the failure such that tests in the set of tests that would be performed after the particular test, according to the order set by the test configuration, are not performed.

16. The computer-implemented method of claim 15, further comprising:

tracking a number of failures encountered during the set of tests of the software application, wherein the cessation of the performance of the set of tests is further based on the number of failures being equal to a predetermination value.

17. The computer-implemented method of claim 15, further comprising:

removing one or more indications of failure from the historical test data to obtain pruned historical test data, the historical test data including timestamps for each of the indications of failure, the one or more indications of failure removed from the historical test data having corresponding timestamps older than a particular threshold, wherein the determination of the ranking is based on the pruned historical test data.

18. The computer-implemented method of claim 15, wherein the identifier for a particular test of the plurality of tests is based on one or more of a test file for the particular test, a test suite for the particular test, and a test name for the particular test, wherein an indication of failure for the particular test is a timestamp of when the particular test encountered a failure during testing of the application, and wherein the indications of failure in the historical test data are timestamps identifying when the corresponding test of the plurality of tests encountered a failure during testing of the application.

19. The computer-implemented method of claim 15, further comprising:
- determining a weighted ranking of the plurality of tests based on the ranking of the plurality of tests and corresponding weight values for the plurality of tests, wherein the test configuration is based on the weighted ranking of the plurality of tests, wherein the weighted ranking for the plurality of tests is further based on computer resource usage or network resource usage for the plurality of tests.

20. The computer-implemented method of claim 15, further comprising:
- receiving a request to test changes in source code corresponding to the software application;
- initiating one or more tests of the source code to validate changes in the source code, wherein the one or more tests of the source code correspond to tests of the test configuration for testing the software application; and
- in response to passing the one or more tests of the source code, building a deployment package for the software application using the source code.

* * * * *